Patented June 30, 1936

2,045,979

UNITED STATES PATENT OFFICE 2,045,979

PLASTIC AND COATING COMPOSITION

John William Croom Crawford, Ardrossan, Scotland, assignor to Imperial Chemical Industries Limited, a corporation of Great Britain No Drawing. Application September 19, 1934, Serial No. 744,674. In Great Britain September 27, 1933

3 Claims. (Cl. 106—22)

This invention relates to plastic and coating compositions and, more particularly, relates to such compositions comprising a polymerized lower alkyl ester of alpha methacrylic acid and a plasticizer therefor, and to the process of preparing such compositions.

The polymerized lower alkyl esters of alpha methacrylic acid, such as polymerized methyl alpha methacrylate and ethyl alpha methacrylate, are suitable for use in coating and plastic compositions and for some purposes do not require modifying agents. For many purposes, however, it is highly advantageous to use these substances in combination with a plasticizer, i. e., a substance of negligibly low volatility and which dissolves, or is dissolved by the polymerized compound, to render the composition less brittle and more supple than it otherwise would be.

An object of the present invention is to provide new and useful plasticizer compositions containing these polymerized methacrylates. A further object is to provide such compositions wherein the plasticizer may be used in varying amounts to obtain different degrees of suppleness, and the like. A further object is to provide such a composition which will be substantially unaffected over long periods of time, that is, will not become brittle on ageing. A still further object is to provide a process of preparing such compositions. Other objects of the invention will be apparent from the description given hereinafter.

The above objects are accomplished according to the present invention by incorporation with a lower alkyl ester of alpha methacrylic acid, either before or after polymerization, an open chain monohydric alcohol containing from 9–22 carbon atoms, inclusive, as a plasticizer therefor.

It has been found that the alcohols of the class given above are compatible with the polymerized methacrylates, at least to a degree sufficient for the amount of plasticizer that it would ordinarily be desirable to employ, and are practically non-volatile at ordinary atmospheric pressures and temperatures.

In carrying out the invention the plasticizer may be incorporated with the polymerized lower alkyl ester of alpha methacrylic acid by kneading, rolling, or working the materials together in the absence of volatile solvents at a temperature considerably above atmospheric temperature, on heated rolls, or other means such as would occur to those skilled in the art. Alternatively, the materials may be incorporated with the aid of a quantity of a mutual volatile solvent in relatively large or small proportions as may be expedient for the nature of the composition and the use to which it is to be put. For example, if it is desired to form a lacquer or coating composition, the ingredients may be incorporated in the presence of a considerable proportion of the volatile solvents which are to be used in the lacquer, while if the object is to prepare a substantially solid plastic composition, the ingredients would be worked together with or without a small proportion of volatile solvent, on hot rolls. The plasticizer may be incorporated with the polymerized methacrylate according to other methods such as are practiced in the plastics and coating arts.

The invention may also be carried out by thoroughly mixing the plasticizer with the monomeric form of the lower alkyl ester of methacrylic acid and subsequently polymerizing the mixture.

In order to illustrate the invention, the following examples are given, parts being by weight:—

*Example 1.*—Ten parts of cetyl alcohol are mixed into 90 parts of monomeric methyl alpha methacrylate. 0.5 parts of benzoyl peroxide, as a polymerization accelerator, are dissolved in the mixture which is then warmed at 80° C. until polymerization is complete. The transparent mass of plastic material obtained is rolled into sheets on rolls at 120–160° C. The sheets thus obtained may be comminuted to a granular powder which is suitable for use in molding transparent articles. The molded composition will soften at a lower temperature than unplasticized polymerized alpha methyl methacrylate and likewise possesses a greater degree of suppleness.

*Example 2.*—Five parts of cetyl alcohol are incorporated into 95 parts of ethyl alpha methacrylate polymer by working on hot rolls at about 140° C. The resulting sheet is comminuted to give a granular powder suitable for use in molding operations.

*Example 3.*—Fifteen parts of geranyl alcohol are dissolved in 85 parts of monomeric methyl alpha methacrylate. 0.4 grams of benzoyl peroxide, as a polymerization accelerator, are added and the mixture is then polymerized by warming. The product thus obtained may be dissolved in appropriate solvents to form a lacquer.

It is to be understood that the above examples are merely illustrative and that the invention broadly comprises a composition of a polymerized lower alkyl ester of alpha methacrylic acid and, as a plasticizer therefor, an open chain monohydric alcohol containing from 9–22 carbon atoms, inclusive, with or without such coloring matter, either soluble or insoluble, fillers, solvents, diluents, other plasticizers, modifiers, "effect" materials, and the like, as would occur to those skilled in the art. The invention is broadly applicable to such compositions whether the plasticizer be mixed with the monomeric compound or incorporated in the polymer.

The open chain monohydric alcohols containing from 9-22 carbon atoms, inclusive, include the straight and branched saturated and unsaturated alcohols. Particularly suitable alcohols coming within this generic class of alcohols are nonyl, decyl, lauryl (dodecyl), myristyl, cetyl, margaryl, stearyl, arachinyl, and docosyl alcohols as saturated alcohols; and geranyl, citronellyl, oleyl, and erucyl alcohols as unsaturated alcohols. All of the alcohols within this class are practically non-volatile at ordinary atmospheric temperature and pressure, have melting points not in excess of 80° C. so that they are readily incorporated in plastics, and are compatible with the polymerized alkyl esters of methacrylic acid to a degree sufficient to permit the incorporation of the amount of plasticizer ordinarily desirable.

The proportion of these plasticizers to be incorporated with the polymerized compound will depend, of course, to a large extent on the properties desired in the resulting composition. The compatibility of the various alcohols herein considered with the different polymerized methacrylates varies but is sufficient in each instance so that the desired amount of plasticizer may be added unless in some particular cases an exceptionally large amount of one of the alcohols having relatively lower compatibility, is to be used. The amount of plasticizer per 100 parts of polymerized compound may be varied from less than 5 parts upwards to over 100 parts, depending on the compatibility of the particular alcohol and polymerized compound and the properties desired in the resulting composition. Obviously, these alcohols may be replaced in part with other plasticizers and the whole range of additional ingredients, such as are familiar to those skilled in the coating and plastics arts, may be added to the composition.

The compositions of the present invention may be used generally in the plastics and coating arts, as will be appreciated by those skilled in these arts. All variations of lacquers, coating compositions, dopes, and the like, may be prepared. In the plastics art, molding compositions may be prepared, as well as various compositions which are to be cast, and the like. All variety of articles made from cellulose derivatives and synthetic resin plastics may be made from these compositions, including interlayer sheets for safety glass, turnery articles, dental plates, and the like.

An advantage of the present invention is that it provides polymerized lower alkyl alpha methacrylate compositions having a greater degree of plasticity than such compositions would have in the absence of plasticizers. A further advantage is that these compositions retain their properties substantially permanently and are not subject to change such as becoming brittle on ageing. A further advantage of the present invention is that this class of plasticizers may be readily incorporated with the polymerized compound or incorporated with the monomeric compound prior to polymerization thereof.

As many apparently widely different embodiments of this invention may be made without departing from the spirit and scope thereof, it is to be understood that the invention is not limited to the specific embodiments thereof except as defined in the appended claims.

I claim:

1. A composition comprising polymerized methyl alpha methacrylate and, as a plasticizer therefor, cetyl alcohol.

2. A composition comprising polymerized methyl alpha methacrylate and, as a plasticizer therefor, geranyl alcohol.

3. A composition comprising polymerized methyl alpha methacrylate and, as a plasticizer therefor, a straight chain saturated monohydric alcohol from the group consisting of cetyl and geranyl alcohols.

JOHN W. C. CRAWFORD.